April 17, 1956  M. L. SMALLEGAN  2,742,020
POULTRY FEEDER

Filed Oct. 30, 1951  2 Sheets-Sheet 1

INVENTOR.
MARVIN L. SMALLEGAN
BY
ATTORNEY

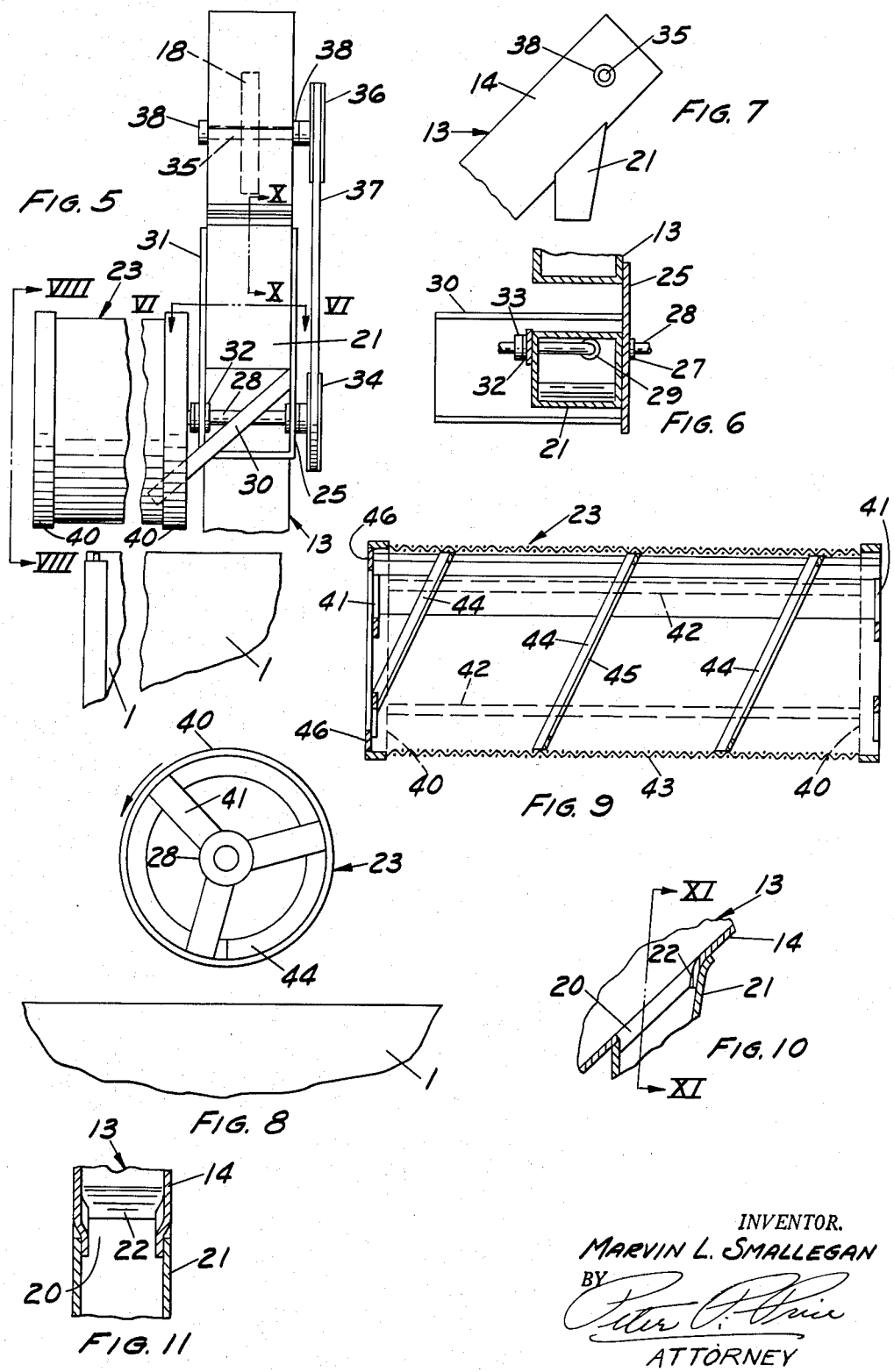

United States Patent Office 2,742,020
Patented Apr. 17, 1956

2,742,020
POULTRY FEEDER

Marvin L. Smallegan, Zeeland, Mich., assignor to Automatic Poultry Feeder Company, Zeeland, Mich., a corporation of Michigan Application October 30, 1951, Serial No. 253,929

2 Claims. (Cl. 119—52)

This invention relates to automatic poultry feeding equipment and more particularly to a feed elevator for removing surplus feed from the troughs of such equipment and placing it in the hopper, whereby the quantum of feed present in the troughs will be kept at a desired level.

This equipment is designed to be used with automatic poultry feeding equipment including a main feed distributing hopper, one type of which is disclosed in my co-pending application entitled Poultry Feed Hopper Construction, Serial No. 233,302, filed June 25, 1951. Although this type of hopper is equipped with means for regulating the level of the feed as it leaves the hopper in the troughs, it has been found that the operation of this equipment can be improved by the addition of further regulatory means. Since the appetite of the flock may vary from day to day and there will be some fluctuation in the amount of feed required by the birds at different hours of the day, it becomes necessary to make frequent, careful adjustments to maintain a constant, correct feed level within the troughs. If excessive quantities of feed are returned to the hopper, this feed tends to pile up around the driving mechanism for the chains within the troughs and to generally disrupt the operation of the hopper and to prevent an even and constant distribution of the feed throughout the troughs. The accumulation of excessive feed in the return portion of the hopper disturbs the proper distribution of the feed from the hopper into the troughs. Further, spilling of the feed sometimes occurs attracting vermin and creating a generally unsanitary condition.

Another problem which has become apparent with this type of machine is the desirability of removing the small quantities of litter which become deposited in the troughs by the birds. This litter may, in some cases, get into the operating mechanism of the automatic feeder, thereby interfering with its operation. Although this litter, normally, does not present a really serious problem, its removal is beneficial both to the operation of the machine and to keep the feed clean and wholesome. This is particularly important with large flocks to discourage the spread of serious poultry diseases.

It is, therefore, a primary object of my invention to provide a simple and effective mechanism for preventing the return of excessive quantities of feed from the troughs to the distributing hopper of an automatic poultry feeding system.

It is a further object of my invention to provide such a machine capable of maintaining a proper quantity of feed in the troughs leaving the hopper irrespective of fluctuations in the quantity of feed being returned to the hopper.

It is an additional object of my invention to provide such a machine capable of removing all litter from the returned feed.

It is a further, additional object of my invention to provide such a mechanism driven entirely from the power system of conventional automatic feeding equipment.

These and other objects and purposes of my invention will be readily seen by those acquainted with the construction of poultry feeding and raising equipment upon reading the following specification and the accompanying drawings.

In the drawings:

Figure 5 is an enlarged, fragmentary view of the upper end of my feed return mechanism including a fragmentary showing of the sorting drum and the hopper.

Figure 6 is an enlarged, fragmentary, sectional view taken along the plane VI—VI of Figure 5 but not showing the sorting drum.

Figure 7 is a fragmentary, side, elevation view of the upper end of my feed elevating mechanism, showing only the feed discharge spout.

Figure 8 is a sectional, elevation view of the forward end of the sorting drum taken along the plane VIII—VIII of Figure 5.

Figure 9 is a sectional view of the sorting drum taken along the plane IX—IX of Figure 1, not showing the mounting shaft or the supports therefor.

Figure 10 is a fragmentary, sectional view taken along the plane X—X of Figure 5.

Figure 11 is a fragmentary, sectional view taken along the plane XI—XI of Figure 10.

Figures 1, 2, 3, 4:
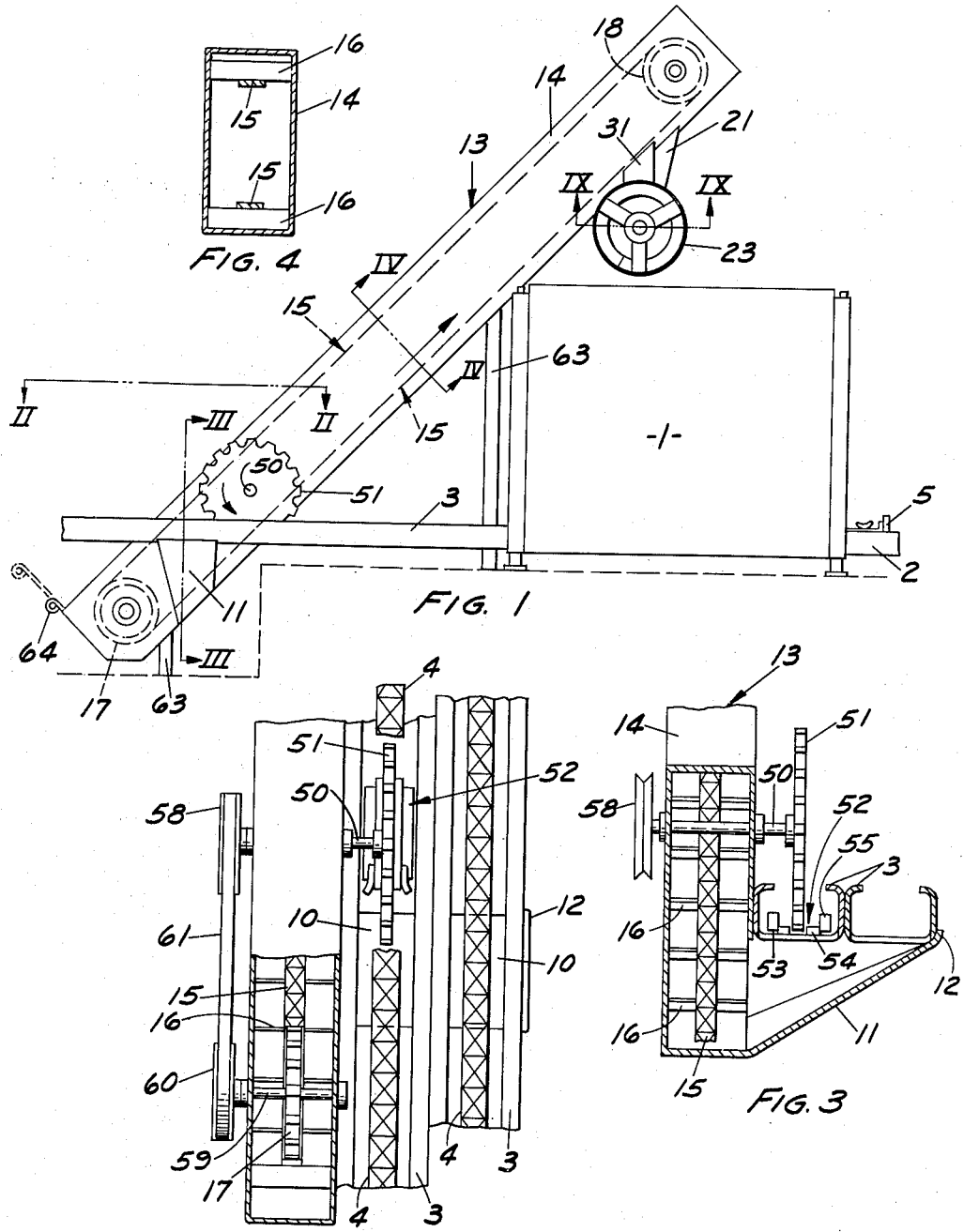
Figure 1 is a side, elevation view of an automatic poultry feeder system equipped with my feed return mechanism.
Figure 2 is a fragmentary, partially broken view of the lower end of my feed return mechanism taken along the plane II—II of Figure 1.
Figure 3 is a fragmentary, sectional, elevation view of my feed return mechanism taken along the plane III—III of Figure 1.
Figure 4 is a sectional view taken along the plane IV—IV of Figure 1.

In executing the objects and purposes of my invention, I have provided openings in the feed troughs on the incoming side of the feed distributing hopper through which any feed being moved along the trough by the traveling chain therein will be dropped out of the trough and through a chute to an elevating conveyor. The elevating conveyor raises the feed to a point above the hopper where it is discharged into a sorting drum. The sorting drum is so constructed that it will drop the feed through into the hopper while transporting the litter and other foreign material to the end of the drum for discharge. The entire elevator is driven from one of the chains traveling in the feed troughs through a sprocket gear engaging the chain. The principle of my invention is that all feed returning to the hopper is removed from the troughs before reaching the hopper and discharge into the storage bin of the hopper.

Referring now to the drawings in greater detail, the numeral 1 indicates a hopper having feed discharge troughs 2 and feed return troughs 3. The hopper 1 is provided with mechanical means for discharging feed from a bin into the troughs 3 as disclosed in detail in my co-pending application entitled Poultry Feed Hopper Construction, Serial No. 233,302, filed June 25, 1951. The troughs 2 and 3 are, in reality, portions of the same trough, being merely opposite ends of a pair of troughs tracing a closed path whereby feed leaving the hopper 1 in the troughs 2 will, if not removed from the troughs, ultimately return to the hopper along the troughs 3. The feed is in dry form and is moved along the troughs 2 and 3 by means of an endless chain 4 (Figure 2), driven by a power source within the hopper 1, as disclosed in the above identified application. Means 5 are provided for regulating the depth of feed leaving the hopper in the discharge troughs 2.

The present invention is concerned with the removal of feed from the return troughs 3 before it reaches the hopper 1. To effect this, each of the troughs 3 is provided with an opening 10 through its bottom surface. The opening 10 extends the entire width of the trough. Thus, all feed moving along the troughs 3 will be discharged through the openings 10. At the openings 10, the troughs 3 are seated over an inclined funnel 11. The inclined funnel 11 is open on its upper side and at its outer end is provided with a lip 12 to seat around the troughs 3.

To one side of the troughs 3 is the inclined, power elevator 13. The elevator includes a housing 14 enclosing an endless chain 15 equipped with spaced baffles 16. The chain 15 is mounted over a driven sprocket 17 (Figure 1) at the elevator's lower end and an idler sprocket 18 (Figure 5) at the elevator's upper end. The baffles 16 are so constructed that they extend the entire width of the housing 14 and contact the lower side of the housing. The driven sprocket 17 is so rotated that the lower run of the chain 15 moves upwardly of the elevator 13, as indicated by the arrow, Figure 1. The funnel 11 communicates with the interior of the housing 14, discharging at a point above the driven sprocket 17 where the baffles 16 have already made tight engagement with the bottom of the housing 14. This arrangement assures a minimum collection of the feed at the lower end of the elevator.

At the upper end of the elevator 13, the lower side of the housing 14 is provided with an aperture 20 (Figures 10 and 11) communicating with the discharge spout 21. The aperture 20 extends the entire width of the housing to assure discharge of all the feed being carried by the baffles 16. The upper edge 22 of the aperture 20 is rolled downwardly to prevent injury to the baffles. The spout 21 discharges onto an inclined chute 30 which empties into an elongated drum 23 mounted over the open, upper side of the bin compartment of the hopper 1.

Adjacent the spout 21, a support 25 is mounted to the housing 14. The support 25 is substantially L-shaped, providing a rigid support for the chute 30 (Figure 5). A bearing 27 is mounted in the vertical leg of the support 25 for rotatably holding one end of the shaft 28. A standard 31 provides a second support for the shaft 28 spaced from the support 25. The shaft 28 passes through a bearing 32 in the standard 31 and is held against axial movement in one direction by the collar 33. The shaft 28, between the support 25 and the standard 31 passes through the inclined chute 30. A seal 29 (Figure 6) surrounds the shaft 28 as it passes through the chute 30 to prevent the escape of material before it has been screened by the drum 23. One end of the shaft 28 mounts a pulley 34 and the other end mounts the drum or rotary screen 23. The outward end of the shaft 35, mounting the idler sprocket 18, is equipped with a pulley 36 (Figure 7). The pulleys 34 and 36 are connected by a belt 37. The shaft 35 is journaled in the housing 14 by means of bearings 38 and is secured to the idler sprocket 18 to rotate therewith.

The shaft 28 mounts the drum 23 for rotation therewith. The drum consists of a pair of end rings 40 each mounted to the shaft 28 by means of radial spokes 41. The end rings 40 are rigidly secured together by the beams 42. The sides of the drum are made from a perforate material such as a metallic, screen fabric 43 of a mesh selected to pass the dry, feed material but retaining material having a larger particle size, such as litter. It will be recognized that perforated, sheet material may be substituted for the screen material to effect the same purpose.

Within the drum 23 is a helical element 44 having a radially inwardly extending flange 45. The spiral 44 is so constructed that as the drum rotates, it urges the material away from the elevator 13 and toward the open discharge end of the drum 23. The end of the drum 23 beneath the elevator 13 has a radially inwardly extending, annular baffle 46 to prevent material discharged by the spout 21 from accidentally working its way out of the inward end of the drum.

The drum 23 is entirely supported upon the bearings 27 and 32. However, additional support may be provided by anchoring the outer end of the shaft 28 to the hopper 1 by means of a suitable bracket.

Power to operate the elevator 13 and the drum 23 is obtained from one of the chains 4. For this purpose, the elevator 13, intermediate its ends, is equipped with a shaft 50 journaled in the sides of the housing 14 (Figures 1 and 2). The shaft 50 is located between the upper and lower runs of the chain 15 where there will be no interference between the chain and the shaft. One end of the shaft 50 is equipped with a sprocket 51 engaging a chain 4 in one of the troughs 3, between the opening 10 and the hopper 1, but closely adjacent the opening. Where the sprocket 51 engages the chain 5, the chain passes through and over a guide assembly 52 (Figures 2 and 3). The guide assembly 52 consists of a plate 53 on which are mounted a pair of rails 54. At the incoming end, the rails 54 are flanked by upstanding wings 55 adapted to center the chain on the rails 54. The rails 54 are spaced sufficiently to permit the teeth of the sprocket 51 to pass through the chain 4 without interference. The movement of the chain 4 rotates the sprocket 51 which in turn rotates the shaft 50. A pulley 58 is mounted on the opposite end of the shaft 50 (Figure 2). The driven sprocket 17 is secured to the shaft 59 for rotation therewith. The shaft 59 is, in turn, secured to the pulley 60 connected to the pulley 58 by the belt 61. The shaft 59 is mounted to the housing 14 by the bearings 62. By this arrangement, the elevator 13 and drum 23 may be driven by the existing feed distributing equipment, eliminating the necessity for additional prime movers and controls.

The elevator 13 is mounted on vertically adjustable legs 63 in order that it may be raised and lowered with the hopper 1 and troughs 3. The legs adjacent the hopper 1 may be dispensed with and the upper end of the elevator supported directly upon the hopper. The lower end of the elevator is provided with a movable gate 64 for clean out purposes. The upper side of the elevator may be mounted on hinges to facilitate access for maintenance. These, however, are details not affecting the principle of my invention.

It will be recognized that my elevator may be used with feeder equipment utilizing only a single trough 3. When this is the case, that portion of the funnel 11 exposed by the elimination of the outer of the troughs 3 is covered by any suitable type of plate to prevent the entrance of litter. Whether one, two or even more troughs 3 are used, the elevator is driven from only one of the chains 15 since this is all that is necessary.

*Operation*

The feed discharged into the troughs 2 by the hopper 1 is slowly moved by the chains 4 along the closed paths defined by the troughs. As the feed moves along the troughs, the birds feed from the troughs and the remainder of the feed returns to the hopper by way of the return troughs 3. The quantity of feed remaining in the troughs after transiting the closed paths will fluctuate from hour to hour and day to day. During its travel, some litter normally becomes mixed with the feed and is returned to the hopper 1.

As the moving chains 4 cross the openings 10, the feed and litter drop through these openings into the funnel 11. This material slides down the inclined funnel 11 and is discharged into the housing 14 of the elevator 13. As the material enters the elevator 13, it is caught in the spaces between the baffles 16 and pushed up the elevator. Since the discharge of the material from the funnel 11 is well above the point of contact between the baffles 16 and the bottom side of the housing 14, as the baffles 16 pass around the driven sprocket 17, all the material will be caught by the baffles and carried up the elevator before it can reach the bottom of the elevator. If material in excess of the capacity of a single baffle 16 is discharged by the funnel 11, some of it may spill over the top of the baffle. The spilled material, however, will be caught and carried up by the next succeeding baffle.

The material is discharged from the elevator 13 by dropping through the aperture 20 into the spout 21 as the baffles approach the idler sprocket 18. The spout discharges the material onto the chute 30 which guides it into the rotating drum 23. The helical element 44, by reason of the rotation of the drum, forces the material outwardly toward the discharge end of the drum. Since the drum walls are of screen material, the feed and the litter are separated, the feed passing through the drum walls into the hopper 1. The litter and bird droppings are discharged through the outward end of the drum, preferably into an appropriate container. The fact that the litter may contain poultry droppings will not affect the operation of the drum. By the time these droppings reach the drum they will have formed a ball including a mass of the feed material bound together by the moisture absorbed from the droppings by the surrounding feed material.

The entire elevator mechanism, including the drum, is driven from one of the chains 4 through the sprocket 50. The direction of rotation of the various parts of my invention is indicated by arrows.

In those cases where the troughs 2 and 3 are provided with guards to prevent the entrance of litter and bird droppings, the screening arrangement may be dispensed with. It will also be recognized that the use of a rotating drum as a screen is only one particular embodiment of such a structure, various other separating means being adaptable for accomplishing the same purposes.

My invention entirely eliminates the problem of excessive quantities of feed returning to the hopper to disrupt the proper discharge of feed from the hopper and interfere with the operation of the system's driving means. My invention entirely eliminates spilling due to piling up of feed at the hopper. This not only conserves feed but keeps the premises neater and more orderly. Conditions favorable for the breeding of vermin and disease spreading insects are eliminated. The need for frequent and careful adjustment of the feed quantity regulators of the hopper 1 is eliminated. The overall result is a material saving in both feed and manpower.

I have illustrated and described but one preferred embodiment of my invention. Various modifications of my invention may be made, each without departing from the principle of my invention. Each of these modifications is to be considered as included in the hereinafter appended claims unless the language of these claims expressly states otherwise.

I claim:

1. In means for removing excess feed from the troughs of powered feeding equipment, said feeding equipment having a hopper, a trough tracing a closed path passing through said hopper, an endless chain in said trough and means for moving said chain along said trough, the combination comprising: an inclined conveyer having means for transporting said feed upwardly; the bottom wall of said trough defining an opening therethrough, said opening spaced from said hopper in a direction opposite to the direction of movement of said chain in said trough; a funnel beneath said opening and communicating with the lower end of said conveyer; a sprocket mounted on said conveyer and adapted to engage said chain in said trough; means for operatively connecting said sprocket with said means for transporting said feed up said conveyer; the discharge end of said conveyer being above said hopper; a screen adjacent the discharge end of said conveyer, said screen being adapted to receive the discharge of said conveyer; the discharge end of said screen being in communication with said hopper.

2. In means for removing excess feed from the troughs of powered feeding equipment, said feeding equipment having a hopper, a trough tracing a closed path passing through said hopper, an endless chain in said trough and means for moving said chain along said trough, the combination comprising: an inclined conveyer having means for transporting said feed upwardly; the bottom wall of said trough defining an opening therethrough said opening spaced from said hopper in a direction opposite to the direction of movement of said chain in said trough; a funnel beneath said opening and communicating with the lower end of said conveyer; a sprocket mounted on said conveyer and adapted to engage said chain in said trough; means for operatively connecting said sprocket with said means for transporting said feed up said conveyer; the discharge end of said conveyer being above said hopper; a cylindrical screen adjacent the discharge end of said conveyer, said screen being adapted to receive the discharge of said conveyer; a shaft mounted to said conveyer, said screen being mounted on said shaft for rotation; means driven by said conveyer for rotating said screen; the discharge end of said screen being in communication with said hopper.

References Cited in the file of this patent

UNITED STATES PATENTS

| 312,341 | Duryea | Feb. 17, 1885 |
| 315,523 | Lynett | Apr. 14, 1885 |
| 1,573,785 | Albright | Feb. 16, 1926 |
| 2,335,611 | Pray | Nov. 30, 1943 |
| 2,522,449 | Inman | Sept. 12, 1950 |
| 2,563,321 | Dugan | Aug. 7, 1951 |
| 2,591,609 | Roberts et al. | Apr. 1, 1952 |

FOREIGN PATENTS

| 800,162 | France | Apr. 20, 1936 |